B. EITNER.
BALL GRINDING MACHINE.
APPLICATION FILED AUG. 31, 1909.
977,717.
Patented Dec. 6, 1910.
2 SHEETS—SHEET 1.
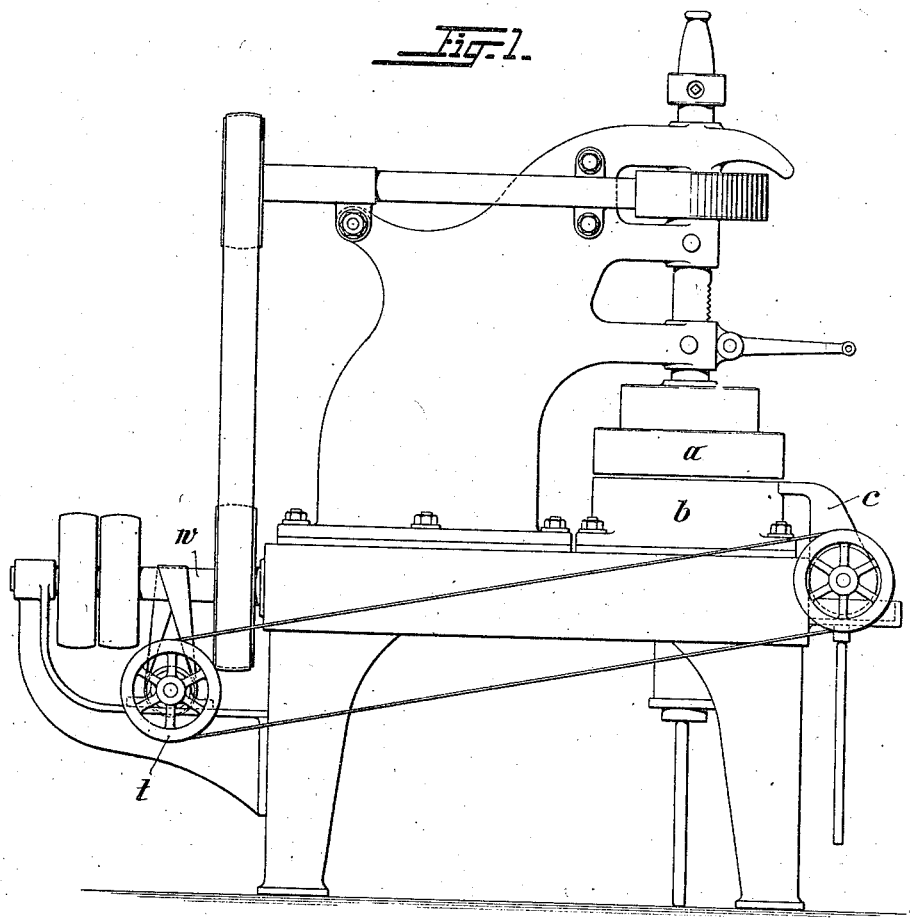
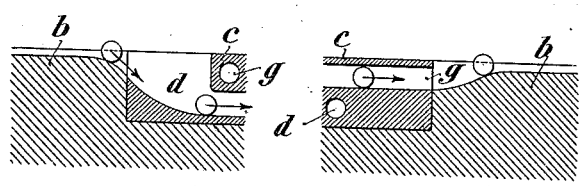

B. EITNER.
BALL GRINDING MACHINE.
APPLICATION FILED AUG. 31, 1909.
977,717.
Patented Dec. 6, 1910.
2 SHEETS—SHEET 2.
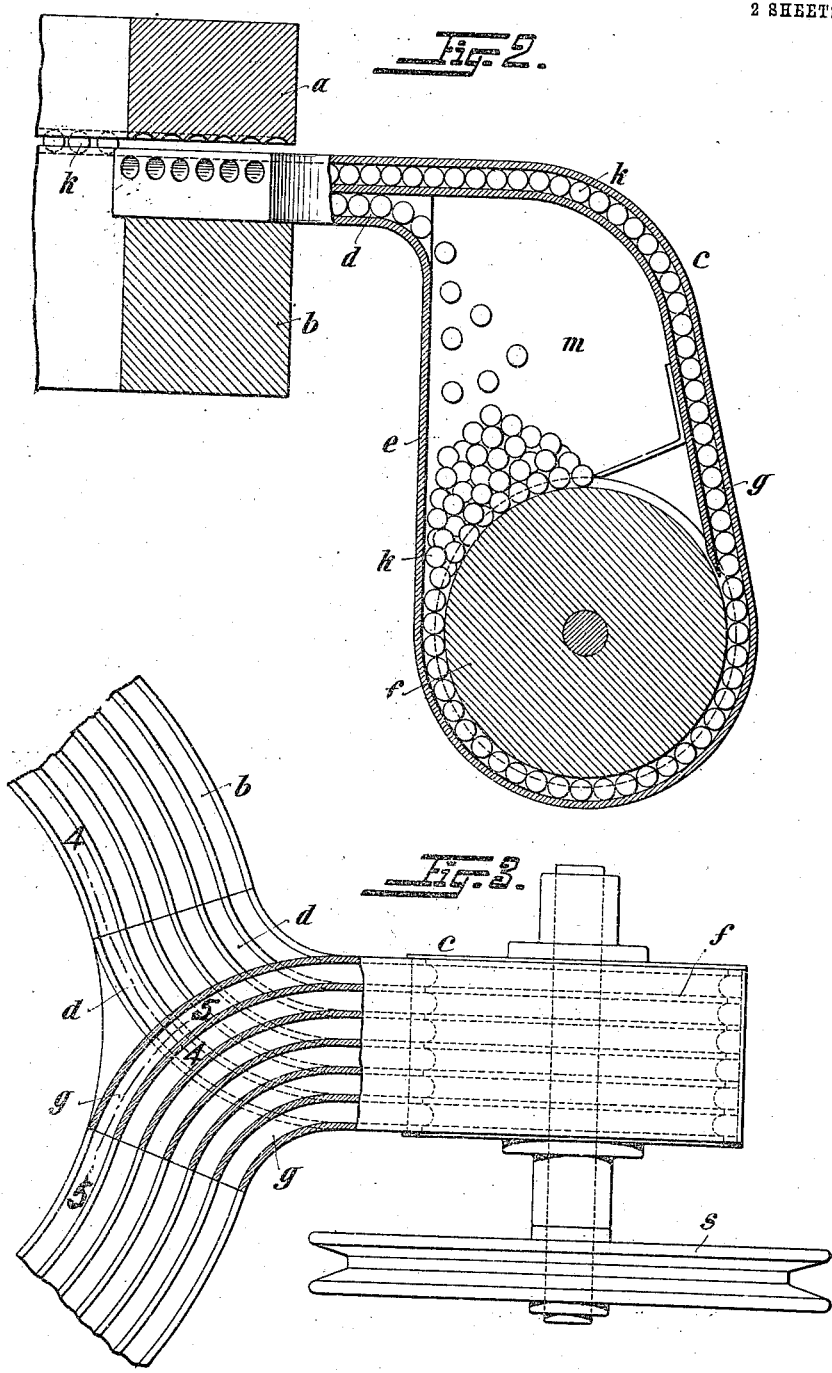

UNITED STATES PATENT OFFICE.

BERTHOLD EITNER, OF BERLIN, GERMANY.

BALL-GRINDING MACHINE.

977,717.        Specification of Letters Patent.      Patented Dec. 6, 1910.

Application filed August 31, 1909. Serial No. 515,388.

*To all whom it may concern:*

Be it known that I, BERTHOLD EITNER, work-master, a subject of the King of Prussia, residing at No. 14 Gotzkowskystrasse, Berlin, in the Kingdom of Prussia, Germany, have invented certain new and useful Improvements relating to Ball-Grinding Machines, of which the following is a full, clear, and exact description.

The present invention relates to a ball grinding machine having grinding plates formed with annular grooves and the main feature of the machine is that these plates are mounted to operate in a horizontal plane and in order thoroughly to mix the balls they are positively removed from and returned to one place on the plate. This positive removal and return of the balls is necessitated by the horizontal mounting of the grinding plates as it is only by this means that it is possible to produce the alteration in the position of the balls, as regards their order and the paths that they follow, which is necessary for thoroughly mixing them.

An embodiment of the invention is illustrated by way of example in the accompanying drawing, in which:

Figure 1 is a side elevation of the grinding machine as a whole. Fig. 2 is a cross section of the means for positively removing and returning the balls. Fig. 3 is a plan corresponding to Fig. 2. Figs. 4 and 5 are cross sections.

As shown in Fig. 1, the grinding plates $a$ and $b$ are superposed and arranged to operate in a horizontal plane. The emery plate $a$ forms the upper rotary plate, while the grooved metal plate $b$ is fixed to the frame or table of the machine. The means $c$ for positively removing and returning the balls for the purpose of mixing them is combined with this fixed metal plate $b$, the essential part of this device consisting of the rotating conveyer plate $f$ arranged in the closed mixing chamber $m$ which plate constitutes the conveyer or displacing member, for the positive removal and return of the balls. This conveyer plate $f$ is arranged in the lower part of the mixing chamber $m$, and is provided on its outer side with the same number of grooves as the metal plate. It is preferably driven by a cable or cord transmission $s$ $t$ directly off the counter shaft $w$ as shown in Fig. 1. The balls are supplied to this grooved conveyer plate $f$ through closed tubes or passages $d$, which directly connect with the grooves in the metal plate $b$, and thereby constitute an extension thereof to a certain extent. The balls, which run at intervals one from the other in the grooves of the plate $a$ and $b$, in order to prevent contact between them, are forced together in these passages $d$, and are forced through the passages by the pressure of the balls which follow them, until they fall over the wall $e$ of the mixing chamber $m$, and reach the periphery of the conveyer plate. Accordingly in these passages $d$ the balls are always directly under the influence of the displacement impulse which they receive during the actual grinding process between the plates $a$ and $b$ by the rotation of the plate $a$; under the influence of this displacement impulse, which as already stated, produces the positive supply to the passages $d$, the balls then come directly within reach of the conveyer plate $f$ which conveys the balls and delivers them to the return passages $g$, which connect at the other side with the annular grooves in the metal plate $b$.

In the device in accordance with the present invention the groove paths in the plates are never entirely interrupted as in other constructions. The passages $d$ and $g$ connect directly with the grooves and thereby constitute an extension thereof in such a manner that the balls both when removed and returned to the grinding plates are given a positive feed from and toward the grooved paths. To this extent the apparatus under the invention differs essentially from machines already referred to in which the balls fall freely from a break in the plates with annular grooves, as soon as they have left the grindstone.

Owing to the positive removal and return of the balls, it is possible to feed the grinding plate more freely and uniformly than when the balls fall freely and the more speedy and intense interchange of the balls shortens the operation for the complete grinding of each charge and likewise permits of increased exactitude in the grinding.

What I claim as my invention, and desire to secure by Patent is:

1. A ball grinding machine comprising grinding plates formed with annular grooves, means for operating said plates in a horizontal plane, means for mixing the balls at an intermediate period in the grinding operation, means for positively removing the balls from said grinding plates to said mixing means, and means for positively returning said balls to said grinding plates.

2. A ball grinding machine comprising grinding plates formed with annular grooves, means for operating said plates in a horizontal plane, a mixing chamber for mixing the balls at an intermediate period in the grinding operation; means for positively removing the balls from said grinding plates to said mixing chamber, and means for positively returning said balls to said grinding plates.

3. A ball grinding machine comprising grinding plates formed with annular grooves, means for operating said plates in a horizontal plane, means for mixing the balls at an intermediate period in the grinding operation, means for positively removing the balls from said grinding plates to said mixing means, a conveyer plate having grooves therein for positively returning said balls to said grinding plate and means for rotating said conveyer plate.

4. A ball grinding machine comprising grinding plates formed with annular grooves, means for operating said plates in a horizontal plane, a mixing chamber for mixing the balls at an intermediate period in the grinding operation; means for positively removing the balls from said grinding plates to said mixing chamber, a conveyer plate having grooves therein for positively returning said balls to said grinding plates, and means for rotating said conveyer plate.

5. A ball grinding machine comprising grinding plates formed with annular grooves, means for operating said plates in a horizontal plane, means for mixing the balls at an intermediate period in the grinding operation, means connecting said mixing means with said grinding plates, means for positively removing the balls from said grinding plates to said mixing chamber, and means for positively returning said balls to said grinding plates.

6. A ball grinding machine comprising plates formed with annular grooves, means for operating said plates in a horizontal plane, a mixing chamber for mixing the balls at an intermediate period in the grinding operation; means for positively removing the balls from said grinding plates to said mixing chamber, a channeled part connecting the mixing chamber with the grooves in the grinding plates, a conveyer plate having grooves therein for positively returning said balls to said grinding plates and means for rotating said conveyer plate.

7. A ball grinding machine comprising grinding plates formed with annular grooves, means for operating said plates in a horizontal plane, a mixing chamber for mixing the balls at an intermediate period in the grinding operation; means for positively removing the balls from said grinding plates to said mixing chamber, a channeled part connecting the mixing chamber with the grooves in the grinding plates, a conveyer plate having grooves therein for positively returning said balls to said grinding plates, means for rotating said conveyer plate and passages connecting the grooves in the conveyer plate with the grooves in the grinding plate.

In witness whereof, I have hereunto signed my name in the presence of two subscribing witnesses.

BERTHOLD EITNER.

Witnesses:
 ROBERT MICHALSKY,
 WOLDEMAR HAUPT.